United States Patent [19]

Daeschner

[11] 4,300,587

[45] Nov. 17, 1981

[54] RELIEF VALVE

[75] Inventor: John C. Daeschner, Torrance, Calif.

[73] Assignee: The Garrett Corporation, Los Angeles, Calif.

[21] Appl. No.: 99,070

[22] Filed: Nov. 30, 1979

[51] Int. Cl.³ .......................................... G05D 11/00
[52] U.S. Cl. .................................... 137/117; 137/118; 415/27
[58] Field of Search .......................... 137/87, 117, 118; 415/27; 60/600

[56] References Cited

U.S. PATENT DOCUMENTS

| | | | |
|---|---|---|---|
| 1,241,372 | 9/1917 | Guyer | 415/27 |
| 2,316,416 | 4/1943 | Gregg | 137/502 |
| 2,559,623 | 7/1951 | Holmes | 415/27 |
| 2,621,472 | 12/1952 | Udale | 60/600 |
| 2,917,067 | 12/1959 | Pearl | 137/117 |
| 2,980,173 | 4/1961 | Perkey | 137/117 |
| 3,044,683 | 7/1962 | Woollenweber, Jr. | 60/600 |
| 3,047,210 | 7/1962 | Best | 415/27 |
| 3,153,508 | 10/1964 | Sawyer | 415/27 |
| 3,207,422 | 9/1965 | Best | 137/100 |
| 3,311,125 | 3/1967 | Beasley | 137/117 |
| 3,330,261 | 7/1967 | Jackson | 137/117 |
| 3,482,405 | 12/1969 | Sansevero, Jr. | 137/117 |
| 3,865,127 | 2/1975 | Lewis | 137/115 |
| 3,933,277 | 1/1976 | Volat et al. | 137/115 |
| 4,117,857 | 10/1978 | Van De Mark | 137/117 |

Primary Examiner—William R. Cline
Assistant Examiner—H. Jay Spiegel
Attorney, Agent, or Firm—Albert J. Miller; Joseph A. Yanny; Stuart O. Lowry

[57] ABSTRACT

An absolute pressure relief valve including a venturi and a diaphragm, for limiting the discharge pressure of an aircraft compressor.

25 Claims, 2 Drawing Figures

RELIEF VALVE

BACKGROUND OF THE INVENTION

This invention relates to pressure relief valves. More specifically, this invention relates to a relief valve for limiting the discharge pressure from a compressor providing air to an aircraft engine and cabin pressurization system.

Relief valves are commonly used in aircraft for preventing excessive pressure levels of air supplied to the engine. Typically, the relief valve responds to the discharge pressure of a compressor to limit the discharge pressure level to a predetermined maximum, and thereby protect the engine against possible damage due to excessive pressure levels.

A wide variety of relief valves are available throughout the prior art. However, in aircraft applications, one major design criteria is that the relief valve must be relatively insensitive to variations in altitude. That is, it is desirable to limit the maximum allowable discharge pressure of the compressor to an absolute value independent of aircraft altitude.

Many prior art systems have been developed in an attempt to regulate closely the discharge pressure of a compressor in an aircraft environment. Some of these systems include relatively complex pressure differential venturi arrangements for controlling the driving speed of the compressor, such as that shown in U.S. Pat. No. 3,207,422. Others include pressure differential systems in combination with relatively expensive bellows devices, such as that shown in U.S. Pat. No. 2,316,416. Still other systems attempt to overcome altitude sensitivity by providing a metallic bellows or the like which has been evacuated to a nearly zero pressure or other suitable reference pressure. However, these systems are not entirely satisfactory in that they comprise relatively complex and expensive relief valve arrangements. Moreover, when a bellows is used, the bellows is susceptible to leakage due to long term aging, vibration failure, and puncture.

This invention overcomes the problems and disadvantages of the prior art by providing an improved relief valve particularly for use with aircraft engine and cabin pressurization systems. The invention includes a diaphragm-operated valve member responsive directly to the pressure differential across a venturi for controllably relieving a portion of the compressor discharge flow to atmosphere.

SUMMARY OF THE INVENTION

In accordance with the invention, an absolute pressure relief valve is provided for limiting the maximum discharge pressure level of an aircraft compressor for supplying compressed air to an engine, and to a cabin pressurization system. The relief valve comprises a diaphragm and a valve member biased by a spring to a normal position closing a compressor discharge relief port. A venturi is located along a compressor discharge flow path, and the relatively reduced pressure level at the venturi throat is communicated to one side of the diaphragm. The compressor discharge pressure is communicated via the relief port and the valve member to the opposite side of the diaphragm whereby the diaphragm compares the relative pressure differential between the compressor discharge pressure and the venturi throat pressure. When the differential exceeds a predetermined magnitude according to the applied spring force, the valve member displaces from the relief port to release a portion of the compressor discharge flow to atmosphere to limit the maximum discharge pressure level.

The relief valve in accordance herewith is simple and provides a high degree of controlled operation at a relatively low cost compared to the prior art. The relief valve of this invention is also tolerant to low level diaphragm and/or valve leakage without any significant affect on controlled operation.

BRIEF DESCRIPTION OF THE DRAWINGS

The accompanying drawings illustrate the invention. In such drawings.

DETAILED DESCRIPTION OF THE PREFERRED EMBODIMENT

Figure 1:
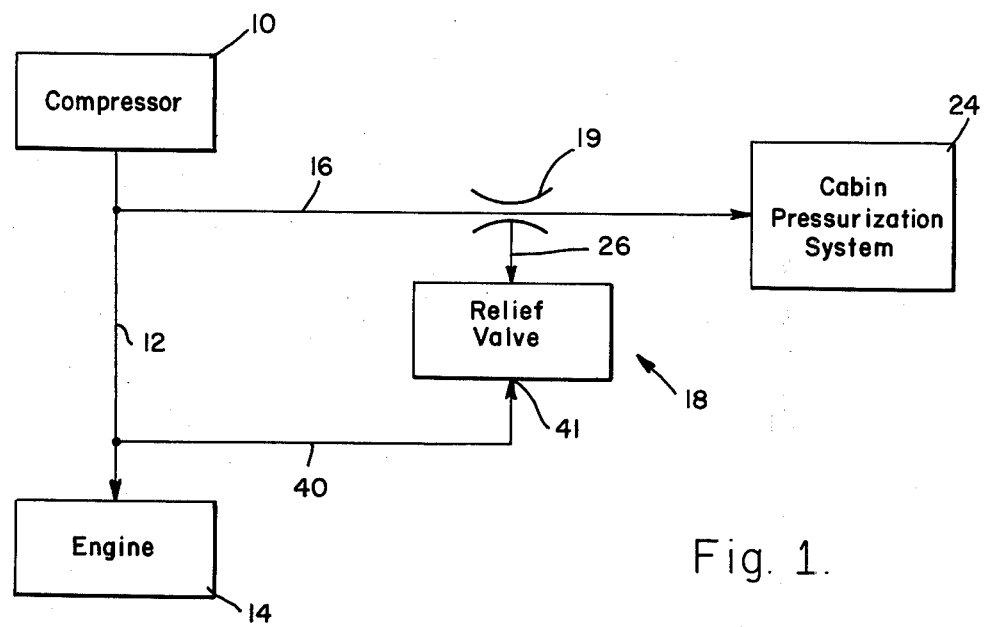
FIG. 1 is a block diagram showing the invention in relation to a compressor, a cabin air pressurization system, and an engine.

An absolute pressure relief valve 18 for an aircraft engine and cabin pressurization system is shown in block form in FIG. 1. As shown, a compressor 10 forming a part of a turbocharger or supercharger system discharges air under pressure to a compressor discharge conduit 12. The compressed discharge air is communicated to an aircraft engine 14 by the conduit 12, and is also communicated to a cabin air pressurization system 24 by a cabin air pressurization system conduit 16. Importantly, the compressor 10, the engine 14, and the pressurization system 24 are generally conventional in form and operation, and thereby are not specifically described in detail herein.

Figure 2:
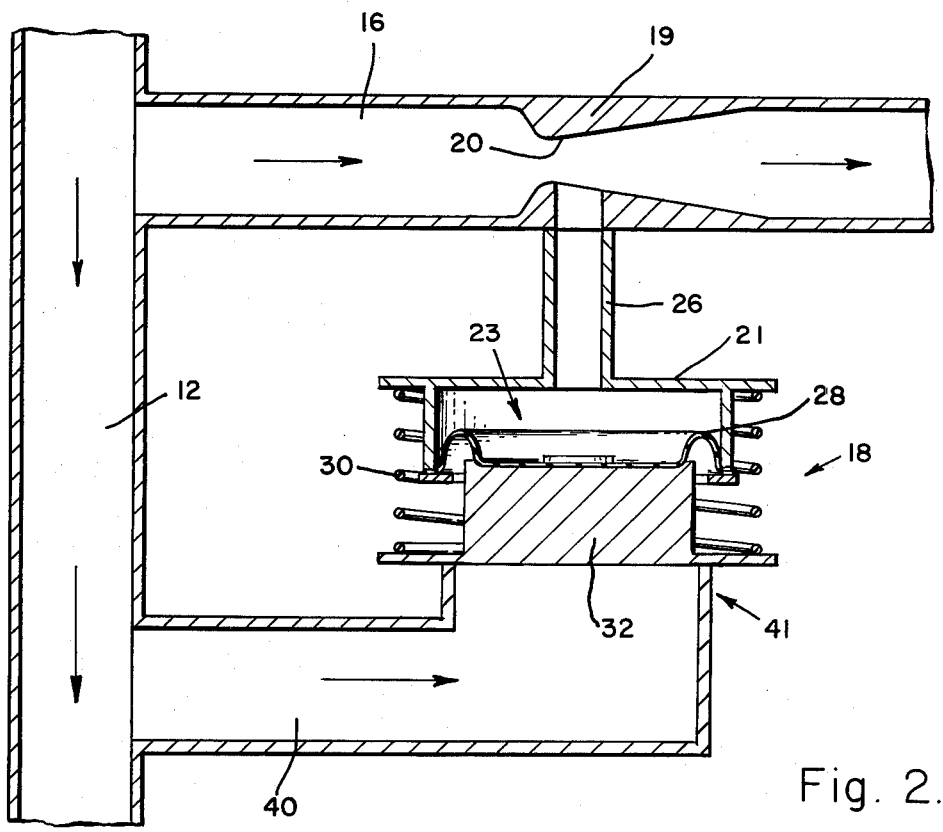
FIG. 2 is an enlarged schematic diagram illustrating the relief valve.

The absolute pressure relief valve 18 communicates between the compressor discharge conduit 12 and the cabin air conduit 16, and operates to limit the pressure level in the conduits 12 and 16 to a predetermined maximum. More specifically, as shown in FIG. 2, the cabin air conduit 16 includes along its length a constriction in the form of a venturi 19, which, in many systems applications, is provided as a part of the cabin air pressurization system 24. The throat portion 20 of the venturi 19 is in communication with the relief valve 18 via a sensing conduit 26. Similarly, a relief conduit 40 is coupled between the relief valve 18 and the compressor discharge conduit 12.

The venturi 19 functions so that, at approximately full or rated power operation of the engine, the reduced pressure at the throat portion 20 of the venturi 19 is on the order of about one-half of compressor discharge pressure. This reduced throat pressure is communicated by the sensing conduit 26 to a flexible diaphragm 28 forming a part of the relief valve 18. The diaphragm 28 cooperates with an open-ended housing 21 to define a pressure chamber 23 into which the sensing conduit 26 communicates the venturi throat pressure.

The diaphragm 28 has a valve member or poppet 32 secured thereto for movement therewith in response to pressure applied to the diaphragm. As illustrated in FIG. 2, the valve member 32 is situated to open and close the adjacent open end of the relief conduit 40, whereby said end of the relief conduit 40 forms a relief port 41 for release of a portion of the compressor discharge flow to atmosphere. A reference spring 30 is positioned under compression for reaction between the valve member 32 and the housing 21 to urge the valve member 32 toward a normal position closing the relief port 41 to prevent the compressor discharge flow from escaping to atmosphere. Desirably, the effective cross sectional areas of the valve member 32 and the diaphragm 28 exposed to compressor discharge pressure and venturi throat pressure, respectively, are substantially equal so as to substantially eliminate altitude sensitivity. Conveniently, the valve member 32 and the diaphragm 28 are thus also affected by ambient pressure in substantially equal and opposite directions so that variations in ambient pressure do not substantially affect operation of the relief valve. Alternately, if desired, the effective cross sectional area of the valve member 32 exposed to compressor discharge pressure may be designed to be slightly larger than the corresponding effective cross sectional area of the diaphragm 28. With this alternate construction, a slight force imbalance will result upon increases in altitude which will tend to assist positive closure of the relief port 41 by the valve member 32 until the desired maximum compressor discharge pressure level is exceeded.

In operation, when the engine 14 is operating at rated power or below rated power, the valve member 32 is retained by the spring 30 in its normal position closing the relief port 41 by virtue of the relatively low pressure differential between compressor discharge pressure and venturi throat pressure. In this condition of operation, all of the compressor discharge flow is supplied to the engine 14 and to the cabin air pressurization system 24. When the engine operation exceeds full or rated power, the compressor discharge pressure increases to a desired maximum and predetermined level. Since further increases in the compressor discharge pressure could result in engine overboost, the relief valve 18 of this invention operates to open the relief port 41 and thereby prevent further pressure increases. More specifically, when this desired maximum pressure level is exceeded, the pressure differential applied across the diaphragm 28 and the valve member 32 overcomes the biasing forces of the spring 30 to cause the valve member 32 to displace from the relief port 41 to release a portion of the compressor discharge flow to atmosphere. Of course, a subsequent decrease in the compressor discharge pressure results in a concurrent decrease in the pressures applied across the diaphragm 28 and the valve member 32 to once again allow the spring 30 to return the valve member 32 to a position closing the relief port 41.

The absolute pressure relief valve of this invention thus comprises a relief valve of relativey high accuracy of control, and which is formed from a relatively small number of inexpensive and relatively simple structural components. Moreover, because of the relatively high volumetric flow through the venturi, the relief valve herein is substantially unaffected by small leakage flows through the diaphragm 28 on the valve member 32 when seated on the relief port 41. This contrasts directly with prior art systems wherein relatively small leakage flows are highly detrimental to system performance.

Various modifications and alterations of the invention will be apparent to those skilled in the art. For example, the spring 30 may include adjustment means (not shown) to allow for adjustment of the biasing spring forces according to the operating conditions of a particular engine. Accordingly, the foregoing description is considered to be exemplary in nature, and not limiting with regard to the scope and spirit of the invention.

What is claimed is:

1. A pressure relief valve for limiting the discharge pressure of a compressor to a predetermined value, said valve comprising:
   a. pressure differential responsive means for relieving compressor discharge pressure when the pressure differential exceeds a predetermined value;
   b. first means for forming a first flowpath communicating the compressor discharge pressure to one side of said pressure differential responsive means and to a first point of use;
   c. second means for forming a second flow path for compressor discharge pressure to a second point of use and including a venturi along the second flow path; and
   d. third means for communicating throat pressure from the venturi to the other side of said pressure differential responsive means so that said pressure differential responsive means responds to the differential between compressor discharge pressure and venturi throat pressure to relieve compressor discharge pressure.

2. A pressue relief valve as recited in claim 1, wherein said first means comprises a conduit for communicating the compressor discharge pressure to an aircraft engine.

3. A pressure relief valve as recited in claim 1, wherein said second means comprises a conduit for communicating the compressor discharge pressure to an aircraft cabin pressurization system.

4. A pressure relief valve as recited in claim 1, wherein said pressure differential responsive means comprises:
   a. diaphragm means; and
   b. a housing cooperating with said diaphragm means for defining a chamber for receiving the venturi throat pressure.

5. A pressure relief valve as recited in claim 4, wherein said first means defines a relief port adjacent said diaphragm means, said diaphragm means including spring means for biasing said diaphragm means to close said port until the pressure differential across said diaphragm means exceeds a predetermined value.

6. A pressure relief valve as recited in claim 5, wherein said diaphragm means comprises a flexible diaphragm cooperating with said housing for defining said chamber, and a valve member movable with said diaphragm for opening and closing said port.

7. A pressure relief valve as recited in claim 6, wherein the cross sectional area of said diaphragm exposed to venturi throat pressure is substantially equal to the cross sectional area of said valve member exposed to compressor discharge pressure.

8. In an aircraft engine and cabin pressurization system, a pressure relief valve for limiting the compressor discharge pressure to a predetermined maximum value, comprising:
   a. a venturi disposed along a compressor discharge first flow path coupled to the cabin pressurization system
   b. a diaphragm;
   c. a housing cooperating with said diaphragm for defining a chamber;
   d. means for communicating throat pressure from the venturi to the chamber;
   e. a valve member movable with said diaphragm;

f. means defining a relief port adjacent said valve member for communicating the compressor discharge pressure in a second flow path to said valve member and to said engine so that said diaphragm and valve member respond to the differential between compressor discharge pressure in said second flow path and venturi throat pressure; and g. spring means for biasing said valve member to close said port until the pressure differential across said diaphragm and valve member exceeds a predetermined value.

9. A pressure relief valve as recited in claim 8, wherein the cross sectional area of said diaphragm exposed to venturi throat pressure is substantially equal to the cross sectional area of said valve member exposed to compressor discharge pressure.

10. A method of limiting the discharge pressure of a compressor to a predetermined value, comprising the steps of:

a. providing pressure differential responsive valve means for relieving compressor discharge pressure when the pressure differential exceeds a predetermined value;

b. communicating the compressor discharge pressure in a first flowpath to one side of said valve means and to a first point of use;

c. passing the compressor discharge through a venturi formed along a compressor discharge pressure second flow path to a second point of use; and d. communicating the venturi throat pressure with the other side of said valve means so that said means responds to the differential between compressor discharge pressure and venturi throat pressure to relieve compressor discharge pressure.

11. The method of claim 10 including the step of communicating the compressor discharge pressure to an aircraft engine.

12. The method of claim 10 including the step of communicating the compressor discharge pressure through the venturi to an aircraft cabin pressurization system.

13. The method of claim 10, wherein the step of providing the pressure differential responsive means comprises the step of providing diaphragm means cooperating with a housing to define a chamber, and wherein said step of communicating the venturi pressure comprises the step of coupling the throat pressure to the chamber.

14. The method of claim 13, wherein said step of communicating the compressor discharge pressure to one side of said means comprises the step of forming a conduit terminating in a relief port adjacent said diaphragm means, and further including the step of biasing said diaphragm means to close the port until the pressure differential across said diaphragm means exceeds a predetermined value.

15. The method of claim 14 including the step of forming said diaphragm means to include a diaphragm cooperating with said housing to define said chamber, and a valve member movable with said diaphragm means for opening and closing said port.

16. The method of claim 15 including the step of forming the diaphragm to have a cross sectional area exposed to venturi throat pressure substantially equal to the cross sectional area of said valve member exposed to compressor discharge pressure.

17. In an aircraft engine and cabin pressurization system, a method of limiting the compressor discharge pressure to a predetermined maximum value, comprising the steps of:

a. providing a venturi disposed along a compressor discharge first flow path coupled to the cabin pressurization system b. providing a diaphragm and a housing cooperating to form a diaphragm chamber;

c. communicating throat pressure from the venturi to the chamber;

d. providing a valve member movable with the diaphragm;

e. communicating the compressor discharge pressure in a second flow path to said engine and via a relief port in said second flow path to the valve member and thereby to the other side of the diaphragm so that the diaphragm and valve member respond to the differential between compressor discharge pressure in said second flow path and venturi throat pressure; and f. biasing the valve member to close the port until the pressure differential across the diaphragm and valve member exceeds a predetermined value.

18. The method of claim 17 including the step of forming the diaphragm to have a cross sectional area exposed to venturi throat pressure substantially equal to the cross sectional area of said valve member exposed to compressor discharge pressure.

19. A pressure relief valve for limiting the compressor discharge pressure to a predetermined value, for use in an aircraft engine and cabin pressurization system comprising:

a. pressure differential responsive means for relieving compressor discharge pressure when the pressure differential exceeds a predetermined value;

b. first means for forming a first flow path communicating the compressor discharge pressure to one side of said pressure differential responsive means and to a first point of use;

c. second means for forming a second flow path for compressor discharge pressure to a second point of use and including a venturi along the second flow path; and d. third means for communicating throat pressure from the venturi to the other side of said pressure differential responsive means so that said pressure differential responsive means responds to the differential between compressor discharge pressure and venturi throat pressure to relieve compressor discharge pressure.

20. A pressure relief valve as recited in claim 19, wherein said first means comprises a conduit for communicating the compressor discharge pressure to an aircraft engine.

21. A pressure relief valve as recited in claim 19, wherein said second means comprises a conduit for communicating the compressor discharge pressure to an aircraft cabin pressurization system.

22. A pressure relief valve as recited in claim 19, wherein said pressure differential responsive means comprises:

a. diaphragm means; and b. a housing cooperating with said diaphragm means for defining a chamber for receiving the venturi throat pressure.

23. A pressure relief valve as recited in claim 22, wherein said first means defines a relief port adjacent said diaphragm means, said diaphragm means including spring means for biasing said diaphragm means to close said port until the pressure differential across said diaphragm means exceeds a predetermined value.

24. A pressure relief valve as recited in claim 23, wherein said diaphragm means comprises a flexible diaphragm cooperating with said housing for defining said chamber, and a valve member movable with said diaphragm for opening and closing said port.

25. A pressure relief valve as recited in claim 24, wherein the cross sectional area of said diaphragm exposed to venturi throat pressure is substantially equal to the cross sectional area of said valve member exposed to compressor discharge pressure.

* * * * *